(12) United States Patent
Lee et al.

(10) Patent No.: US 11,385,421 B2
(45) Date of Patent: Jul. 12, 2022

(54) OPTICAL DEVICE, GAS SENSOR, METHODS OF FORMING AND OPERATING THE SAME

(71) Applicant: Agency for Science, Technology and Research, Singapore (SG)

(72) Inventors: Lennon Yao Ting Lee, Singapore (SG); Lionel You Liang Wong, Singapore (SG); Alex Yuandong Gu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 195 days.

(21) Appl. No.: 16/961,011

(22) PCT Filed: Jan. 16, 2019

(86) PCT No.: PCT/SG2019/050026
§ 371 (c)(1),
(2) Date: Jul. 9, 2020

(87) PCT Pub. No.: WO2019/143294
PCT Pub. Date: Jul. 25, 2019

(65) Prior Publication Data
US 2021/0063658 A1 Mar. 4, 2021

(30) Foreign Application Priority Data
Jan. 22, 2018 (SG) .......................... 10201800567U

(51) Int. Cl.
*G02B 6/42* (2006.01)
*G01N 21/3504* (2014.01)

(52) U.S. Cl.
CPC ....... *G02B 6/4246* (2013.01); *G01N 21/3504* (2013.01)

(58) Field of Classification Search
CPC ....... G01N 21/3504; G01N 2021/1704; G02B 6/4246; G02B 6/4219
See application file for complete search history.

(56) References Cited

U.S. PATENT DOCUMENTS

| 6,611,085 B1 | 8/2003 | Gee et al. |
| 6,628,041 B2 | 9/2003 | Lee et al. |
| (Continued) | | |

FOREIGN PATENT DOCUMENTS

| DE | 102005008077 A1 | 8/2006 |
| JP | 2010210384 A | 9/2010 |
| WO | 2013089053 A1 | 6/2013 |

OTHER PUBLICATIONS

International Search Report for International Application No. PCT/SG2019/050026 dated Mar. 25, 2019, pp. 1-4.
(Continued)

*Primary Examiner* — Ryan A Lepisto
*Assistant Examiner* — Mary A El-Shammaa
(74) *Attorney, Agent, or Firm* — Shackelford, Bowen, McKinley & Norton, LLP

(57) ABSTRACT

Various embodiments may relate to an optical device. The device may include an elongate substrate, an emitter portion at a distal end portion of the elongate substrate, the emitter portion configured to emit light, and an actuator portion at a proximal end portion of the elongate substrate opposite the distal end portion of the elongate substrate. The emitter portion may include a first electrode, a second electrode, and an active layer between the first electrode and the second electrode so that the light is emitted due to an increase in a temperature of the active layer upon application of a first potential difference between the first electrode and the second electrode. The active layer may be patterned to form a photonic crystal layer for enhancing directionality of the emitted light.

20 Claims, 14 Drawing Sheets

(56) References Cited

U.S. PATENT DOCUMENTS

| | | | |
|---|---|---|---|
| 7,688,378 | B2 | 3/2010 | Mouli |
| 8,134,285 | B2 | 3/2012 | Marshall |
| 9,207,170 | B2 | 12/2015 | Trollsch |
| 9,214,604 | B2 | 12/2015 | Ali et al. |
| 11,256,331 | B1* | 2/2022 | Diest ................... G06F 3/016 |
| 2004/0213534 | A9 | 10/2004 | Matsuura et al. |
| 2006/0257067 | A1 | 11/2006 | Bratkovski et al. |
| 2006/0274189 | A1 | 12/2006 | Mouli |
| 2009/0139340 | A1 | 6/2009 | King et al. |
| 2011/0174799 | A1 | 7/2011 | Ali et al. |
| 2016/0061784 | A1* | 3/2016 | Madhav ............ G01N 29/222 73/24.02 |
| 2016/0062109 | A1 | 3/2016 | Morikawa et al. |
| 2017/0038230 | A1* | 2/2017 | Kshirsagar ......... G01D 11/245 |
| 2020/0072739 | A1* | 3/2020 | Sasayama .......... G01N 21/314 |
| 2020/0309684 | A1* | 10/2020 | Avetisov .............. G01N 21/39 |
| 2022/0077355 | A1* | 3/2022 | Beeson ............... H01L 33/505 |

OTHER PUBLICATIONS

Written Opinion of the International Searching Authority for International Application No. PCT/SG2019/050026 dated Mar. 25, 2019, pp. 1-4.

Parameswaran et al., "Micromachined Thermal Radiation Emitter from a Commercial CMOS Process," IEEE Electron Device Letters, vol. 12, No. 2, Feb. 1991, pp. 57-59.

Konz et al., "Micromachined IR-Source with Excellent Blackbody Like Behaviour," Proceedings of SPIE, vol. 5836, 2005, pp. 540-548.

O'Regan et al., "Silicon Photonic Crystal Thermal Emitter at Near-Infrared Wavelengths," Scientific Reports, vol. 5, Aug. 21, 2015, pp. 1-8.

Mai et al., "Optimization and Comparison of Photonic Crystal Resonators for Silicon Microcantilever Sensors," Sensors and Actuators A, vol. 165, 2011, pp. 16-25.

* cited by examiner

FIG. 2 form an emitter portion at a distal end portion of an elongate substrate — 202 form an actuator portion at a proximal end portion of the elongate substrate opposite the distal end portion of the elongate substrate — 204 p-Si substrate p-Si substrate

| Parameters | Length |
|---|---|
| Period | 1.6um |
| Diameter of large circle | 0.95um |
| Diameter of small circle | 0.7um |
| Si thickness | 0.8um |

OPTICAL DEVICE, GAS SENSOR, METHODS OF FORMING AND OPERATING THE SAME

CROSS-REFERENCE TO RELATED APPLICATION

This application claims the benefit of priority of Singapore application No. 10201800567U filed Jan. 22, 2018, the contents of it being hereby incorporated by reference in its entirety for all purposes.

TECHNICAL FIELD

Various aspects of this disclosure relate to an optical device. Various aspects of this disclosure relate to an optical arrangement, such as a gas sensor. Various aspects of this disclosure relate to a method of forming an optical device, an optical arrangement, and/or a gas sensor. Various aspects of this disclosure relate to a method of operating an optical device, an optical arrangement, and/or a gas sensor.

BACKGROUND

Scientists have been actively researching on micro-hotplates as a thermal source or as a blackbody radiator. Through decades of research, the thermo-electric conversion efficiency of micro-hotplates has been improved. Periodic structures such as photonic crystals have been demonstrated for the capability to change the light emission spectrum of thermal emitters and to increase the emissivity.

SUMMARY

Various embodiments may relate to an optical or a micro-hotplate device. The device may include an elongate substrate. The device may also include an emitter portion at a distal end portion of the elongate substrate, the emitter portion configured to emit light. The device may further include an actuator portion at a proximal end portion of the elongate substrate opposite the distal end portion of the elongate substrate. The emitter portion may include a first electrode, a second electrode, and an active layer between the first electrode and the second electrode so that the light is emitted due to an increase in a temperature of the active layer upon application of a first potential difference between the first electrode and the second electrode. The active layer may be patterned to form a photonic crystal layer for enhancing a directionality of the emitted light. The actuator portion may include a stacked arrangement including a first electrical pad, a second electrical pad, and a piezoelectric layer between the first electrical pad and the second electrical pad such that the actuator portion, i.e. the piezoelectric layer, is configured to deform, e.g. bend, the elongate substrate upon application of a second potential difference between the first electrical pad and the second electrical pad, thereby moving the emitter portion.

Various embodiments may relate to a method of forming an optical or micro-hotplate device. The method may include forming an emitter portion at a distal end portion of an elongate substrate, the emitter portion configured to emit light. The method may also include forming an actuator portion at a proximal end portion of the elongate substrate opposite the distal end portion of the elongate substrate. The emitter portion may include a first electrode, a second electrode, and an active layer between the first electrode and the second electrode so that the light is emitted due to an increase in a temperature of the active layer upon application of a first potential difference between the first electrode and the second electrode. The active layer may be patterned to form a photonic crystal layer for enhancing a directionality of the emitted light. The actuator portion may include a stacked arrangement including a first electrical pad, a second electrical pad, and a piezoelectric layer between the first electrical pad and the second electrical pad such that the actuator portion is configured to deform, e.g. bend, the elongate substrate upon application of a second potential difference between the first electrical pad and the second electrical pad, thereby moving the emitter portion.

Various embodiments may relate to a method of operating an optical or micro-hotplate device. The method may include activating an emitter portion at a distal end portion of an elongate substrate to emit light by applying a first potential difference between a first electrode and a second electrode so that a temperature of an active layer between the first electrode and the second electrode increases to emit the light. The active layer may be patterned to form a photonic crystal layer for enhancing a directionality of the emitted light. The method may also include activating an actuator portion at a proximal end portion of the elongate substrate opposite the distal end portion of the elongate substrate to deform, e.g. bend, the elongate substrate by applying a second potential difference between a first electrical pad and a second electrical pad of a stack arrangement, the stacked arrangement further including a piezoelectric layer between the first electrical pad and the second electrical pad, to move the emitter portion.

BRIEF DESCRIPTION OF THE DRAWINGS

The invention will be better understood with reference to the detailed description when considered in conjunction with the non-limiting examples and the accompanying drawings, in which:

FIG. 2 is a schematic illustrating a method of forming an optical or micro-hotplate device according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical device/optical arrangement/gas sensor are analogously valid for the other methods or optical devices/gas sensors. Similarly, embodiments described in the context of a method are analogously valid for an optical device/optical arrangement/gas sensor, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Typically, conventional micro-hotplates are fixed. There is no micro-hotplates that can be adjusted on the market.

Various embodiments may provide an optical device that have advantages over conventional devices. The optical device may be a hotplate device, e.g. a micro-hotplate device.

Various embodiments may provide an adjustable optical or micro-hotplate device.

Figure 1:
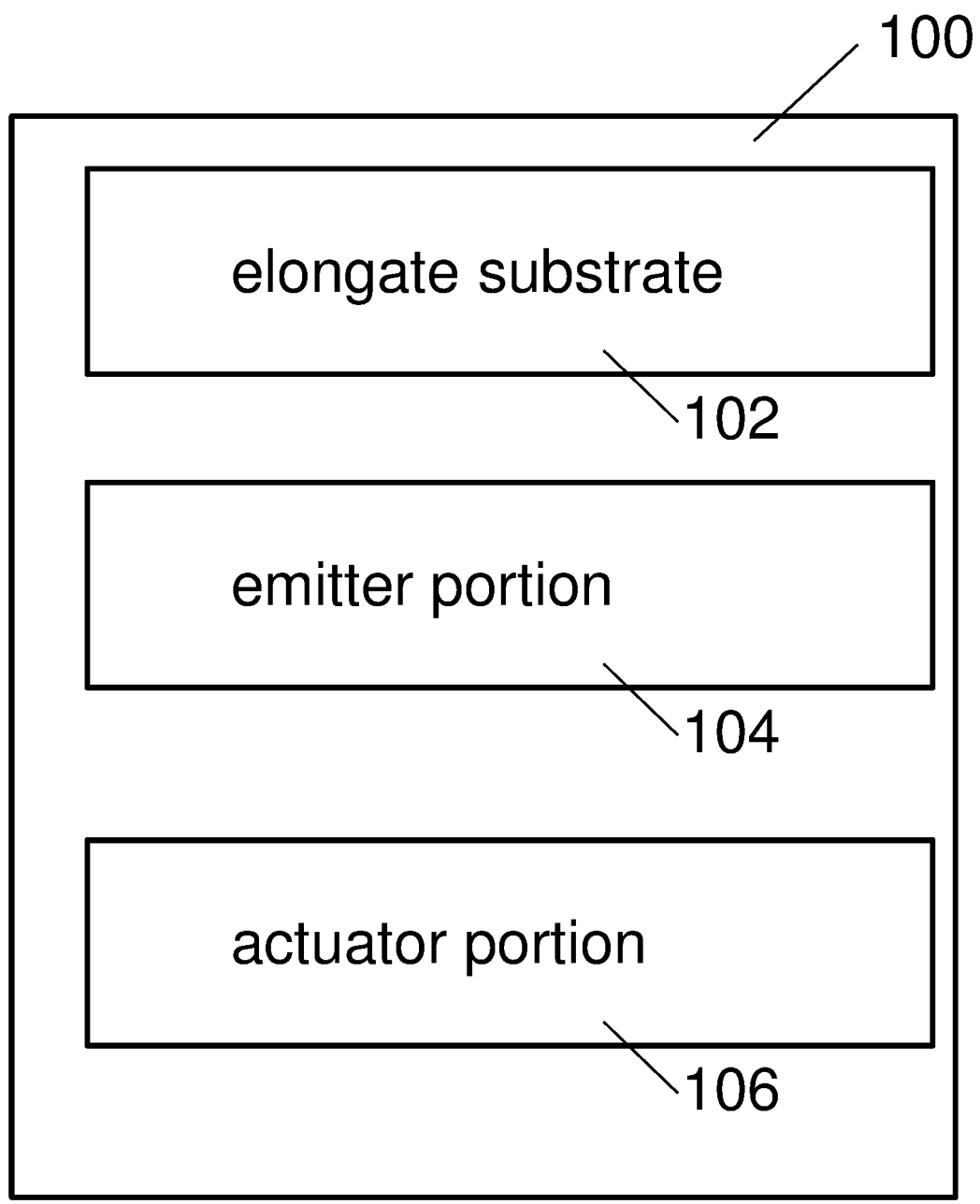
FIG. 1 shows a general illustration of an optical or a micro-hotplate device according to various embodiments.

FIG. 1 shows a general illustration of an optical or a micro-hotplate device 100 according to various embodiments. The device 100 may include an elongate substrate 102. The device 100 may also include an emitter portion 104 at a distal end portion of the elongate substrate 102, the emitter portion 104 configured to emit light. The device 100 may further include an actuator portion 106 at a proximal end portion of the elongate substrate 102 opposite the distal end portion of the elongate substrate 102. The emitter portion 104 may include a first electrode, a second electrode, and an active layer between the first electrode and the second electrode so that the light is emitted due to an increase in a temperature of the active layer upon application of a first potential difference between the first electrode and the second electrode. The active layer may be patterned to form a photonic crystal layer for enhancing a directionality of the emitted light. The actuator portion 106 may include a stacked arrangement including a first electrical pad, a second electrical pad, and a piezoelectric layer between the first electrical pad and the second electrical pad such that the actuator portion 106, i.e. the piezoelectric layer, is configured to deform, e.g. bend, the elongate substrate 102 upon application of a second potential difference between the first electrical pad and the second electrical pad, thereby moving the emitter portion 104.

In other words, the device 100 may include an elongate substrate 102 such as a cantilever, an emitter portion 104 over one end portion of the elongate substrate 102, and an actuator portion 106 over another end portion of the elongate substrate 102. The emitter portion 104 may include an active layer and a pair of electrodes such that when a potential difference is applied between the electrodes, the active layer is heated up to emit light, e.g. infrared light or radiation. The actuator portion 106 may include a pair of electrical pads and a piezoelectric layer between the pads so that when a voltage is applied between the pads, the piezoelectric layer causes the elongate substrate 102 or cantilever to bend.

The emitter portion 102 may generally refer to a portion of the device 100 that is configured to emit light. The actuator portion 106 may refer to another portion of the device 100 that is configured to actuate the device 100.

In various embodiments, the active layer of the emitter portion 102 may be a part of the elongate substrate 102, and may alternatively be referred to as an active region. In various other embodiments, the active layer of the emitter portion 102 may be a layer on or over the substrate.

In various embodiments, the elongate substrate 102 may include dopants of a first charge polarity or conductivity type. The active layer may include dopants of a second charge polarity or conductivity type opposite the first charge polarity or conductivity type. For instance, the elongate substrate may be p-doped; while the active layer is n-doped. A portion of the active layer may be in contact with the substrate to form a p-n junction. A portion of the active layer may be in contact with the substrate to form a p-n junction. In various embodiments, the elongate substrate 102 may be a cantilever or a membrane.

In various embodiments, a portion of the elongate substrate 102 may include dopants of a first charge polarity or conductivity type, e.g. p-doped, while a further portion of the elongate substrate 102 may include dopants of a second charge polarity or conductivity type, e.g. n-doped. The portion and the further portion of the elongate substrate 102 may form a p-n junction. The active layer may also include dopants of the second charge polarity or conductivity type, and may be in contact with the further portion of the elongate substrate 102.

The substrate 102 may include silicon, germanium, or any other suitable materials. P-type dopants may for instance be boron or gallium, while n-type dopants may for instance be potassium, or arsenic.

The p-n junction may help to keep the current flowing between the first electrode and the second electrode to the emitter portion 102 or the active layer, and may help reduce or prevent current spreading.

In various embodiments, the device 100 may additionally include an insulator layer on the elongate substrate 102 such that a first portion of the insulator layer is between the emitter portion 104 and the elongate substrate 102, and a second portion of the insulator layer is between the actuator portion 106 and the elongate substrate 102.

In various embodiments, the insulator layer may include silicon oxide, silicon nitride, or any other suitable dielectric material. The insulator layer may form a dielectric barrier to keep the current flowing between the first electrode and the second electrode to the emitter portion 102 or the active layer, and may help reduce or prevent current spreading. In addition, the insulator layer may also provide thermal insulation as well as mechanical support. Air would provide electrical and thermal insulation, but may not provide mechanical support, and as such, may not be used.

In various embodiments, the piezoelectric layer may include lead zirconate titanate (PZT), aluminium nitride (AlN), or scandium aluminum nitride.

In various embodiments, the active layer may include a plurality of holes. The plurality of holes may extend from a first surface of the active layer to a second surface of the active layer opposite the first surface.

In various embodiments, the holes may be of different diameters. For instance, a first group of holes may each have a first diameter, and a second group of holes may each have a second diameter greater than the first diameter. For instance, the first group of holes may each have a first diameter of about 0.7 µm, while the second group of holes may each have a second diameter of about 0.95 µm. In various embodiments, a diameter of a hole of the plurality of holes may be of a value selected from a range from 0.5 µm to 2 µm.

In various embodiments, the holes may form a periodic array. The holes may form a honeycomb pattern. The active layer may include silicon, germanium, or any other suitable materials.

In various embodiments, the light emitted by the emitter portion may be within 1 steradian. In various embodiments, the light may be infrared (IR) light, e.g. mid-IR light. The light may have a range of wavelengths selected from 2 µm to 12 µm. The light may be a broadband light.

The emitter portion may remain undeformed during the deformation of the elongate substrate.

The substrate 102 may be a cantilever.

Various embodiments may provide an optical arrangement. The optical arrangement may be, but may not be limited to a gas sensor. The optical arrangement may include an optical device as described herein, the optical device configured to emit light. The optical arrangement may also include a detector, i.e. an optical detector such as a photo-detector, configured to receive or detect light emitted by the optical or micro-hotplate device. The optical arrangement may be configured such that a parameter, e.g. a wavelength or range of wavelengths, of the light that is received by the detector is based on the movement of the emitter portion.

The optical arrangement may further include a feedback circuit in electrical communication with the detector and the actuator portion. The detector may be configured to generate a feedback electrical signal upon the detector detecting or receiving the light. The feedback circuit may be further configured to generate an adjustment electrical signal based on the feedback electrical signal. The actuator portion may be configured to deform, e.g. bend, the elongate substrate based on the adjustment electrical signal.

Various embodiments may provide a gas sensor for sensing a gas. The gas sensor may include a detector portion. The detector portion may include a substrate. The detector portion may also include a waveguide over the substrate. The detector portion may additionally include a grating coupler on the waveguide. The gas sensor may additionally include an optical or micro-hotplate device as described herein. The gas sensor may also include a support, e.g. a stand, configured to suspend the optical or micro-hotplate device over the detector portion. The emitter portion may face the detector portion. In various embodiments, the gas sensor may be configured such that a wavelength or range of wavelengths of the light that is received by the detector portion is based on the movement of the emitter portion. The gas may be determined or identified based on a parameter of the light received by the detector portion, such as an absorption peak/wavelength of the received light.

The light may be coupled from the optical or micro-hotplate device to the detector portion. The light may be coupled from the optical or micro-hotplate device to the detector portion through the gas.

In various embodiments, the gas sensor may include a cladding layer on the substrate. The waveguide may be on the cladding layer.

The gas sensor or the detector portion may include a detector, i.e. an optical detector such as a photodetector, optically coupled to the waveguide. The detector may be configured to detect the light travelling along the waveguide to the detector.

In various embodiments, the detector may be an on-chip detector. In various other embodiments, the detector may be an off-chip detector. In various embodiments, the gas sensor may further include a photonics circuit optically coupling the waveguide to the detector.

The gas sensor may also include a feedback circuit in electrical communication with the detector and the actuator portion. The detector may be configured to generate a feedback electrical signal upon the detector detecting the light. The feedback circuit may be further configured to generate an adjustment electrical signal based on the feedback electrical signal. The actuator portion may be configured to deform, e.g. bend, the elongate substrate based on the adjustment electrical signal. The feedback circuit may, for instance, include a processor electrically connected to the detector. The processor may further be electrically connected to the piezoelectric layer. The processor may be configured to receive the feedback electrical signal generated by the detector, and may further be configured to generate the adjustment electrical signal based on the feedback electrical signal.

FIG. 2 is a schematic illustrating a method of forming an optical or micro-hotplate device according to various embodiments. The method may include, in 202, forming an emitter portion at a distal end portion of an elongate substrate, the emitter portion configured to emit light. The method may also include, in 204, forming an actuator portion at a proximal end portion of the elongate substrate opposite the distal end portion of the elongate substrate. The emitter portion may include a first electrode, a second electrode, and an active layer between the first electrode and the second electrode so that the light is emitted due to an increase in a temperature of the active layer upon application of a first potential difference between the first electrode and the second electrode. The active layer may be patterned to form a photonic crystal layer for enhancing a directionality of the emitted light. The actuator portion may include a stacked arrangement including a first electrical pad, a second electrical pad, and a piezoelectric layer between the first electrical pad and the second electrical pad such that the actuator portion is configured to deform, e.g. bend, the elongate substrate upon application of a second potential difference between the first electrical pad and the second electrical pad, thereby moving the emitter portion.

In other words, the method may include forming an emitter portion and an actuator portion over different portions of an elongate substrate. The emitter portion may include an active layer and a pair of electrodes such that when a potential difference is applied between the electrodes, the active layer is heated up to emit light, e.g. infrared light or radiation. The actuator portion may include a pair of electrical pads and a piezoelectric layer between the pads so that when a voltage is applied between the pads, the piezoelectric layer causes the elongate substrate or cantilever to bend.

For avoidance of doubt, the steps shown in FIG. 2 may not necessarily be in sequence. For instance, step 202 may occur before, after, or at the same time as step 204.

The method may include forming the first electrode, the second electrode, and the active layer between the first electrode and the second electrode. The method may also include patterning the active layer to form the photonic crystal layer. The patterning may include forming a plurality of holes extending from a first surface of the active layer to a second surface of the active layer opposite the first surface.

The method may additionally include forming the stacked arrangement. The method may include forming the first electric pad, the piezoelectric layer over the first electrical pad, and the second electric pad over the piezoelectric layer so that the piezoelectric layer is between the first electrical pad and the second electrical pad.

The method may also include doping the elongate substrate so that the elongate substrate includes dopants of a first charge polarity. The method may further include doping the active layer so that the active layer includes dopants of a second charge polarity opposite the first charge polarity.

The method may also include forming an insulator layer on the elongate substrate such that a first portion of the insulator layer is between the emitter portion and the elongate substrate, and a second portion of the insulator layer is between the actuator portion and the elongate substrate.

Various embodiments may relate to forming an optical arrangement, such as but not limited to a gas sensor. The method may include providing or forming an optical device as described herein to emit light. The method may include providing or forming a detector.

Various embodiments may relate to a method of forming a gas sensor. The method may include forming a detector portion. The detector portion may include a substrate, a waveguide over the substrate, and a grating coupler on the waveguide. The method may further include forming or providing an optical or micro-hotplate device as described herein. The method may also include forming a support configured to suspend the optical device over the detector portion. The emitter portion may face the detector portion. The gas sensor may be configured such that a wavelength of the light that is received by the detector portion is based on the movement of the emitter portion.

The method may also include forming a cladding layer on the substrate. The waveguide may be on the cladding layer.

The method may also include optically coupling a detector to the waveguide. The detector may be configured to detect the light travelling along the waveguide to the detector. The method may further include forming the detector.

The method may additionally include forming a feedback circuit in electrical communication with the detector and the actuator portion.

The detector may be configured to generate a feedback electrical signal upon the detector detecting the light. The feedback circuit may be further configured to generate an adjustment electrical signal based on the feedback electrical signal. The actuator portion may be configured to deform or bend the elongate substrate based on the adjustment electrical signal.

In various embodiments, the optical or micro-hotplate device may be formed from a silicon-on-insulator (SOI) wafer. The suspended device may be formed by release of the underlying oxide using hydrofluoric (HF) acid. The device may be formed by various photolithography, deposition, etching, and lift-off steps.

Figure 3:
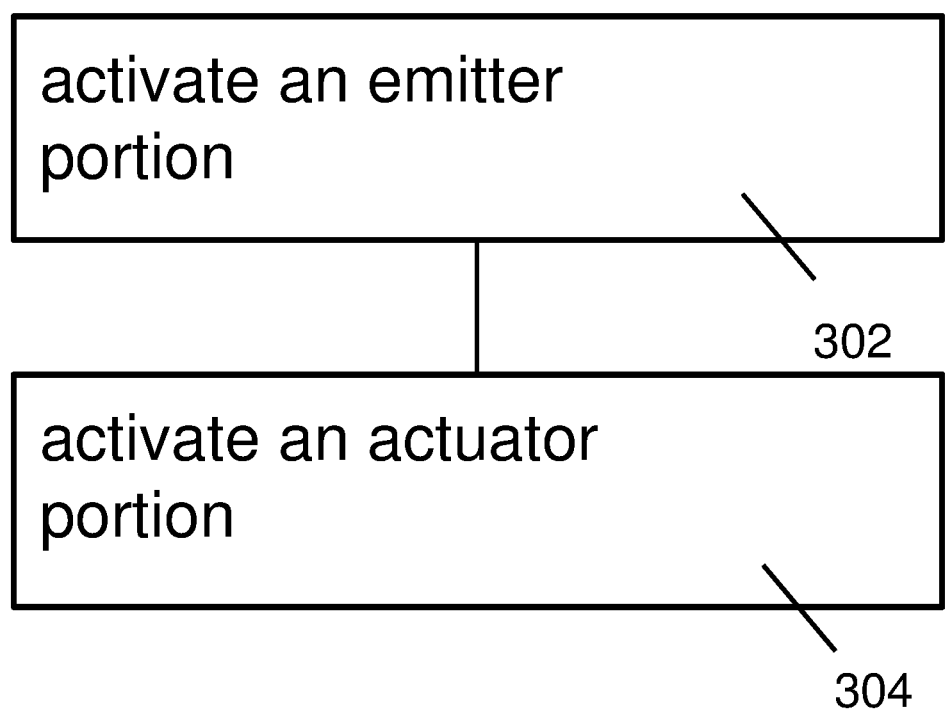
FIG. 3 is a schematic illustrating a method of operating an optical or micro-hotplate device according to various embodiments.

FIG. 3 is a schematic illustrating a method of operating an optical or micro-hotplate device according to various embodiments. The method may include, in 302, activating an emitter portion at a distal end portion of an elongate substrate to emit light by applying a first potential difference between a first electrode and a second electrode so that a temperature of an active layer between the first electrode and the second electrode increases to emit the light. The active layer may be patterned to form a photonic crystal layer for enhancing a directionality of the emitted light. The method may also include, in 304, activating an actuator portion at a proximal end portion of the elongate substrate opposite the distal end portion of the elongate substrate to deform, e.g. bend, the elongate substrate by applying a second potential difference between a first electrical pad and a second electrical pad of a stack arrangement, the stacked arrangement further including a piezoelectric layer between the first electrical pad and the second electrical pad, to move the emitter portion.

For avoidance of doubt, the steps shown in FIG. 3 may not necessarily be in sequence. For instance, step 302 may occur before, after, or at the same time as step 304.

Various embodiments may relate to a method of operating an optical arrangement. The method may include providing the optical arrangement as described herein. The method may further include operating the optical or micro-hotplate device to emit light so that the light emitted by the optical or micro-hotplate device may be received or detected by the detector.

The optical arrangement may operate by active tuning of the source to ensure optical alignment and higher power transmission.

Various embodiments may relate to a method of operating a gas sensor. The method may include operating an optical or micro-hotplate device as described herein, the optical or micro-hotplate device suspended over a detector portion by a support with the emitter portion of the optical or micro-hotplate device facing the detector portion, so that a wavelength of the light that is received by the detector portion is based on the movement of the emitter portion. The detector portion may include a substrate, a waveguide over the substrate, and a grating coupler on the waveguide.

The method may include operating the optical device to emit the light. The method may also include providing the gas. The method may further include adjusting or deforming the optical device (to move the emitter portion) so that the light coupled to the detector portion is at a first predetermined wavelength, e.g. 4.3 μm for carbon dioxide. The detector portion may generate a measurement signal based on the light passing through the gas to the detector portion.

The method may further include further include adjusting or deforming the optical device (to move the emitter portion) so that the light coupled to the detector portion is at a second predetermined wavelength, e.g. 4.0 μm. The detector portion may generate a reference signal based on the light (coupled to the detector) at the second predetermined wavelength that is not absorbed by the gas. The method may further include comparing the measurement signal and the reference signal to determine a parameter of the gas, or to identify the gas. The measurement signal and the reference signal may be compared using a processor electrically connected to the detector of the detector portion.

A single sensor may thus be used to generate the measurement signal and the reference signal. Various embodiments may reduce noise and calibration issues which have been plaguing conventional optical gas sensors.

The active layer of the micro-hotplate device or optical device may be made of highly-doped $n^+$ silicon (Si). The active layer may be referred to as a micro-hotplate or a thermal emitter. The thermal emission of the active layer may be achieved with a pair of electrodes, i.e. a cathode and an anode. A high voltage may be applied across the electrodes to allow current to flow through the $n^+$ Si so that the temperature of the active layer increases via Joule heating. Spontaneous emission or thermal radiation may increase due to the increase in temperature according to Stefan-Boltzmann law according to the following equation.

$$P = A\varepsilon\sigma T^4 \quad (1)$$

wherein P is the power, A is the surface area, ε is the emissivity of the material included in the active layer, and T is the temperature.

The micro-hotplate device may include a suspended cantilever. The active layer may be patterned with holes arranged in a honeycomb lattice to increase the emissivity and to enhance certain portions of the spectrum. The directionality of the thermal emission may be increased so that light can be concentrated within a certain steradian. The patterned active layer may focus the light beam. Another outcome from having a periodic pattern on the active layer is that the power increases due to the surface area being increased without increasing the actual required dimensions or area of the active layer.

The micro-hotplate device may include an actuation mechanism that would allow the active layer to be moved. Using electrostatic comb drivers as the actuation mechanism may require high voltages. In addition, using electrostatic comb drivers would require electrodes that cover most of the surface area on torsion bars. As the active layer may also require very high voltages, the high voltages at the electrodes of the active layer and at the electrodes of the electrostatic comb drivers may cause breakdown and failure of the device.

In various embodiments, the actuation mechanism may be piezoelectric actuation. The device may include a first electrical pad, a second electrical pad, and a piezoelectric layer between the first electrical pad and the second electrical pad. In addition, the device may include an insulator layer or an oxide bar that serves as electrical and thermal isolation. Further, the device may include a p-type junction barrier to focus the currents and thermal energy to the perforated emitter or active layer for focused, optical radiation.

Figure 4:
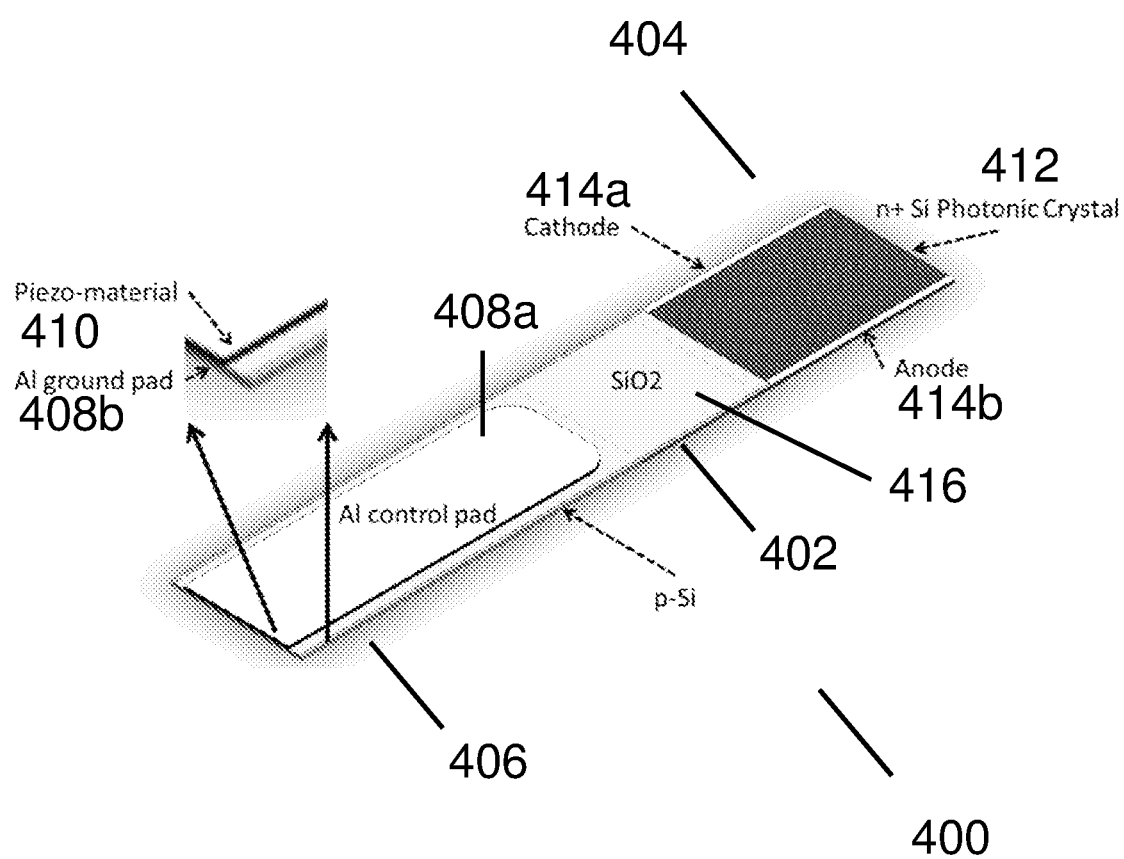
FIG. 4 is a schematic illustrating a perspective view of an optical or micro hotplate device according to various embodiments, with the inset showing a magnification of the actuator portion.

FIG. 4 is a schematic illustrating a perspective view of an optical or micro hotplate device 400 according to various embodiments, with the inset showing a magnification of the actuator portion 406. The device 400 may include an elongate substrate such as a cantilever 402. The device 400 may also include an emitter portion 404 at a distal end portion of the elongate substrate 402, the emitter portion configured to emit light, e.g. infrared waves or radiation. The device 400 may additionally include an actuator portion 406 at a proximal end portion of the elongate substrate 402 opposite the distal end portion of the elongate substrate 402. The actuator portion 406 may include a piezoelectric stacked arrangement including a first electrical pad 408a (e.g. aluminum (Al) control pad), a second electrical pad 408b (e.g. aluminum (Al) ground pad), and a piezoelectric layer 410 between the first electrical pad 408a and the second electrical pad 408b. The piezoelectric stacked arrangement may enable actuation of the device 400 with precise control and using electronic means.

The emitter portion 404 may include an active layer 412, i.e. the perforated hotplate or thermal emitter, at the free end portion of the device 400. The active layer 412 may be a $n^+$ photonic crystal. The free end portion may not include any piezoelectric material under the perforated hotplate or thermal emitter 412. As a result, the region of the thermal emitter or micro hotplate 412 may remain planar under piezoelectric actuator, and only the position of the thermal emitter or micro hotplate 412 may be changed as a result of the piezoelectric actuation. The planarity of the thermal emitter or micro hotplate 412 may ensure that thermal emission would not be affected. The elongate substrate 402 may include a single silicon layer underlying the entire device 400, thus preserving mechanical integrity.

The emitter portion 404 may also include a first electrode 414a (e.g. the cathode) at a first lateral side of the active layer 412, and a second electrode 414b at a second lateral side of the active layer 412 opposite the first lateral side. The device 400 may further include an insulator layer 416 on the elongate substrate 402 separating the emitter portion 404 and the actuator portion 406.

Figure 5A:
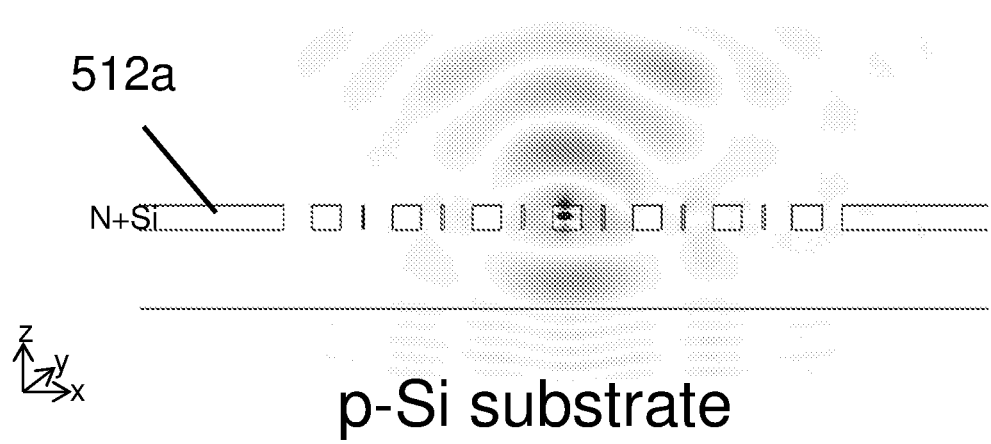
FIG. 5A is a schematic illustrating the emission of a perforated photonic crystal according to various embodiments for an electric dipole along the x-axis.
Figure 5B:
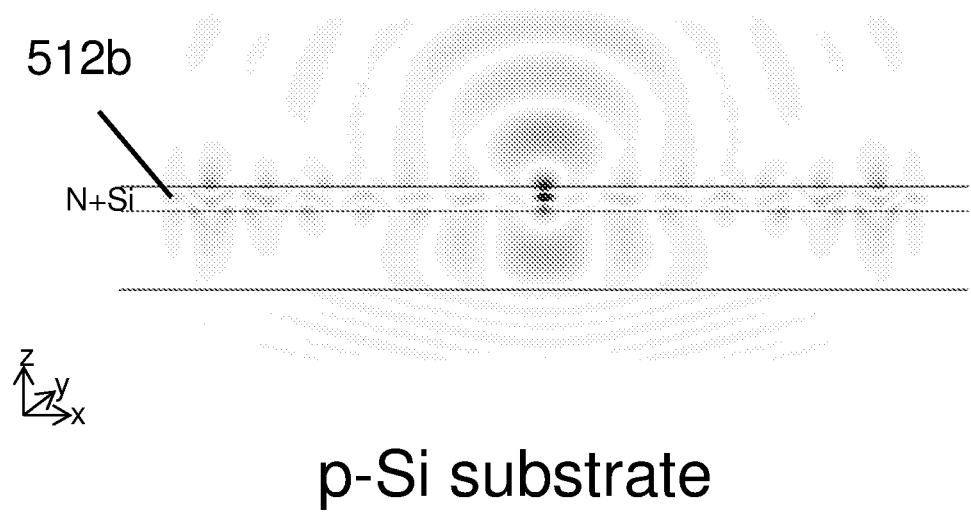
FIG. 5B is a schematic illustrating the emission of a reference silicon (Si) slab for an electric dipole along the x-axis.

FIG. 5A is a schematic illustrating the emission of a perforated photonic crystal 512a according to various embodiments for an electric dipole along the x-axis. FIG. 5B is a schematic illustrating the emission of a reference silicon (Si) slab 512b for an electric dipole along the x-axis. The emission shown in FIG. 5B propagates in all directions for an electric dipole along the x-axis, while the emission shown in FIG. 5A has an enhanced vertical top directionality for an electric dipole along the x-axis.

Figure 5C:
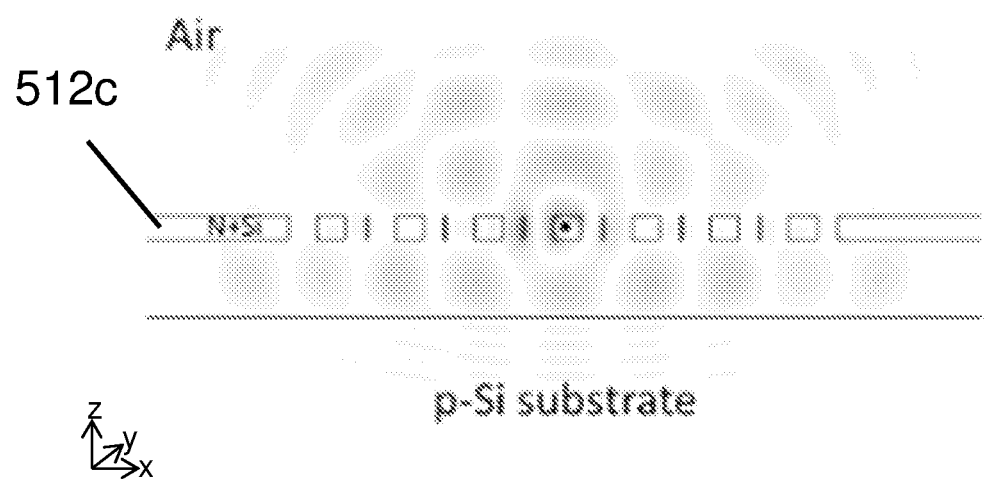
FIG. 5C is a schematic illustrating the emission of a perforated photonic crystal according to various embodiments for an electric dipole along the y-axis.
Figure 5D:
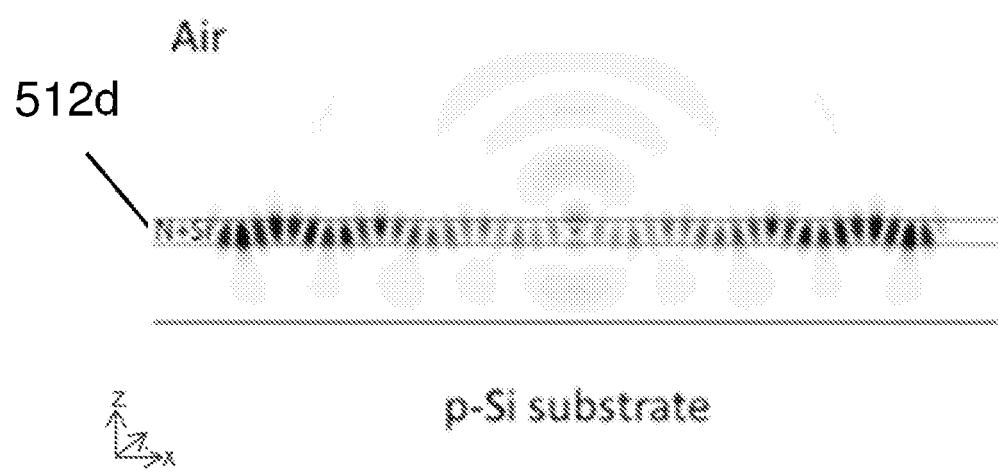
FIG. 5D is a schematic illustrating the emission of a reference silicon (Si) slab for an electric dipole along the y-axis.

FIG. 5C is a schematic illustrating the emission of a perforated photonic crystal 512c according to various embodiments for an electric dipole along the y-axis. FIG. 5D is a schematic illustrating the emission of a reference silicon (Si) slab 512d for an electric dipole along the y-axis. For the suspended reference silicon slab 512d, most of the light from the electric dipole may remain in the suspended silicon slab 512d, and may not couple into the air, while the emission pattern for the perforated photonic crystal 512c shows that increased vertical directionality may be achieved for an electric dipole along the y-direction.

Figure 5E:
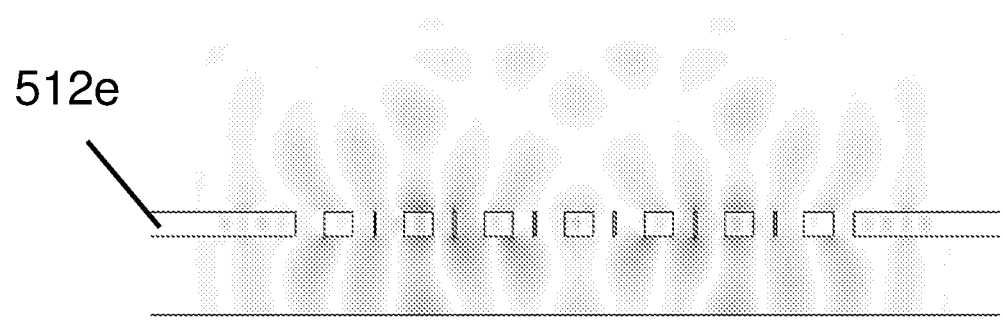
FIG. 5E is a schematic illustrating the emission of a perforated photonic crystal according to various embodiments for an electric dipole along the z-axis.
Figure 5F:
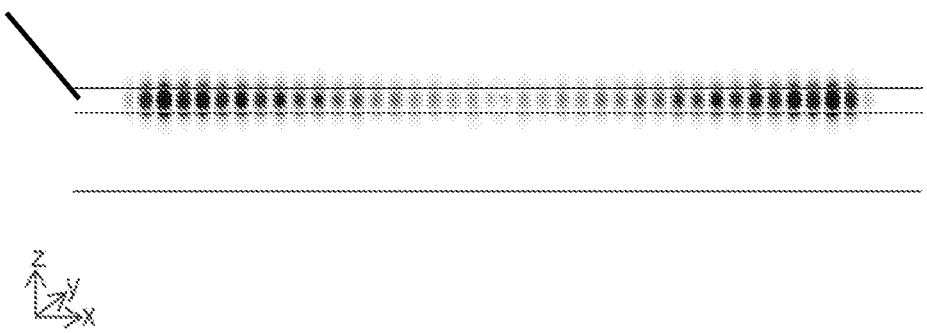
FIG. 5F is a schematic illustrating the emission of a reference silicon (Si) slab for an electric dipole along the z-axis.

FIG. 5E is a schematic illustrating the emission of a perforated photonic crystal 512e according to various embodiments for an electric dipole along the z-axis. FIG. 5F is a schematic illustrating the emission of a reference silicon (Si) slab 512f for an electric dipole along the z-axis. For the suspended reference silicon slab 512f, nearly all the light may remain coupled in the suspended reference silicon slab 512f, and may not be coupled into the air. The emission pattern for the perforated photonic crystal 512e shows that increased vertical directionality may be achieved for an electric dipole along the z-direction.

Figure 6A:
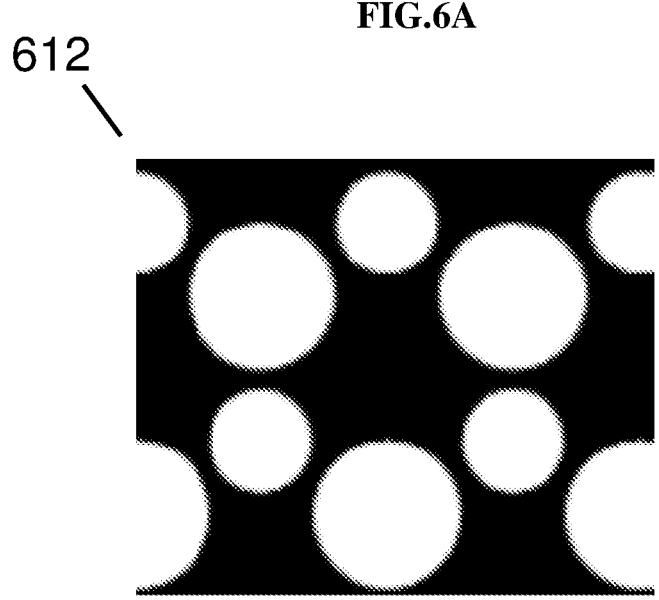
FIG. 6A shows (top) a honeycomb pattern of a photonic crystal according to various embodiments; and (bottom) a table of different parameters of the honeycomb photonic crystal pattern according to various embodiments.

FIG. 6A shows (top) a honeycomb pattern of a photonic crystal 612 according to various embodiments; and (bottom) a table of different parameters of the honeycomb photonic crystal pattern according to various embodiments. FIG. 6A only shows a photonic crystal 612 according to various embodiments, It may also be envisioned that in alternative embodiments, the photonic crystal 612 may be of any other suitable dimensions.

Figure 6B:
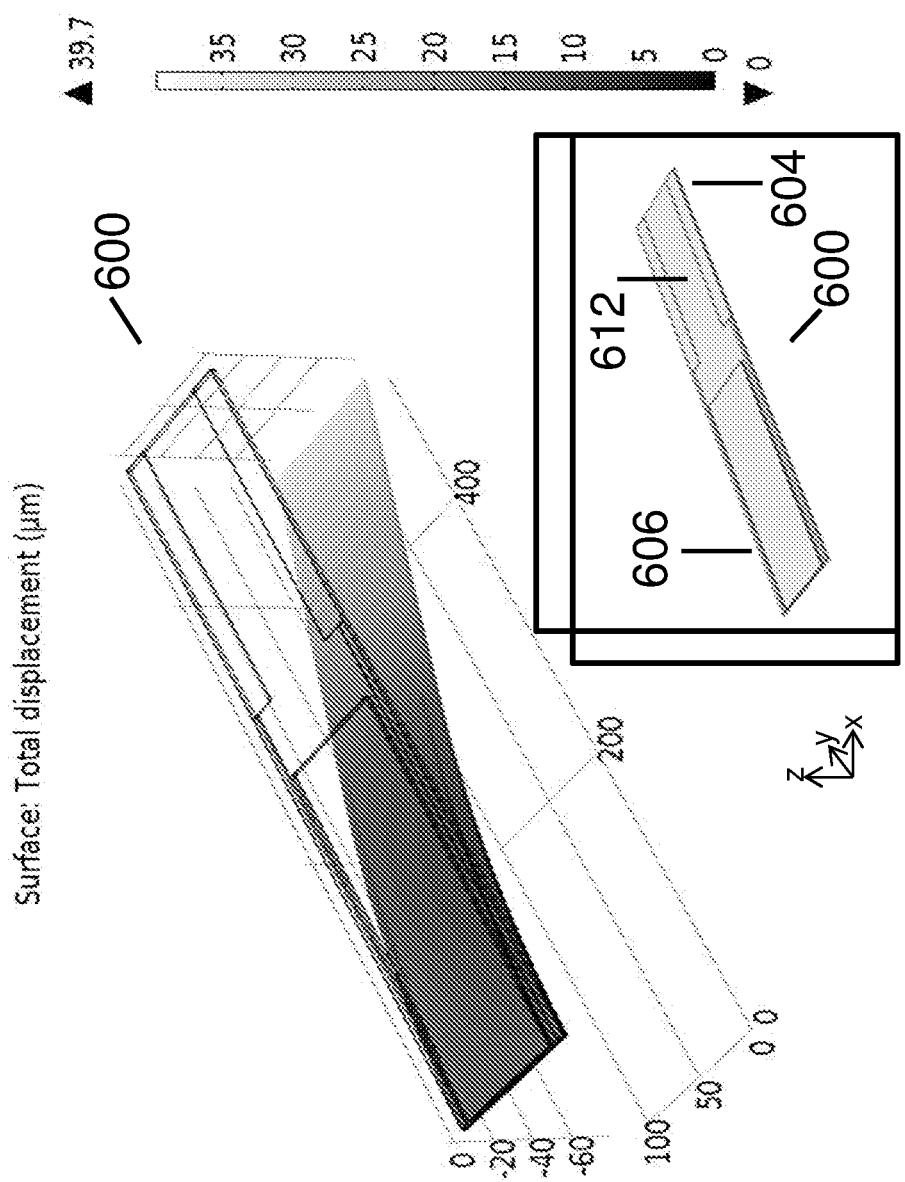
FIG. 6B is a simulation schematic showing the piezoelectric actuation of the optical or micro-hotplate device according to various embodiment, while the inset shows a schematic of the unactuated micro-hotplate device according to various embodiments.

FIG. 6B is a simulation schematic showing the piezoelectric actuation of the optical or micro-hotplate device 600 according to various embodiment, while the inset shows a schematic of the unactuated micro-hotplate device 600 according to various embodiments.

The simulation of the device 600 was carried out with using different types of piezoelectric materials, namely lead zirconate titanate-4 (PZT-4) and aluminium nitride (AlN). The thickness of the device 600 is set to 1.5 μm.

Various voltage levels were applied and the corresponding angles of deflection of the emitter portion 604 with respect to the non-piezoelectric region, i.e. the actuator portion 606, were measured. Using PZT-4, a voltage of 20V was shown to be able to cause an angle of 5.904°. When AlN is used, a voltage of 100V is required to cause an angle change of 0.577°. The simulation results show the movement, i.e. deflection, of the free-standing thermal emitter 612 upon actuation of the device 600. The results also show that the emitter region 604 remains flat after movement or deflection.

Figure 7A:
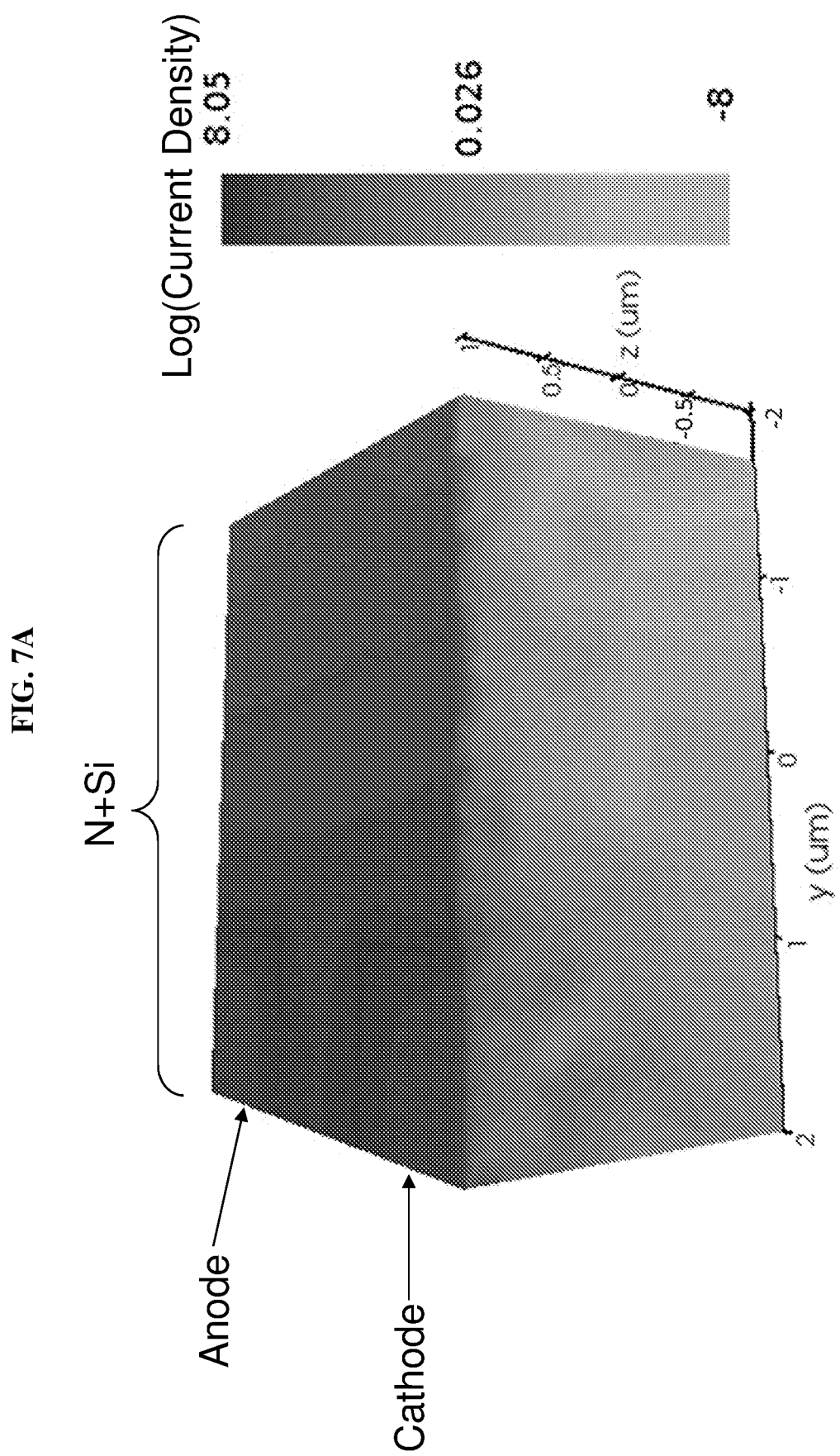
FIG. 7A shows an electrical simulation of an optical or micro-hotplate device with isolation control according to various embodiments.

FIG. 7A shows an electrical simulation of an optical or micro-hotplate device with isolation control according to various embodiments. FIG. 7A shows the emitter portion of the cantilever structure. The emitter portion joins to the remaining cantilever structure and includes a uniform, highly-doped n⁺ silicon. As can be seen from FIG. 7A, the current density spreads across the entire surface reducing the efficiency of the emitter since the emitter would be in the area between the anode and the cathode.

Figure 7B:
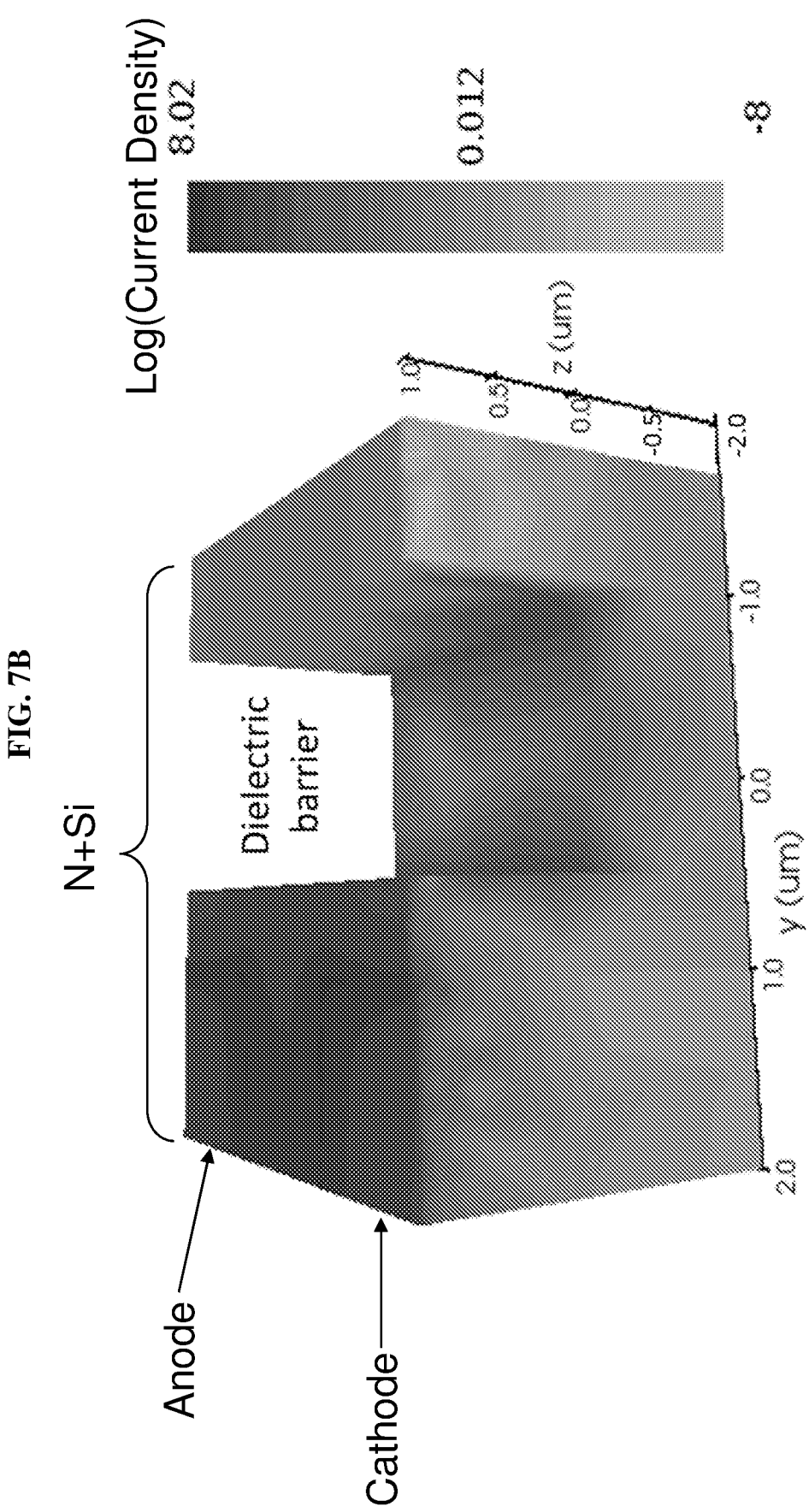
FIG. 7B shows an electrical simulation of an optical or micro-hotplate device with a dielectric barrier according to various embodiments. The dielectric barrier may be formed by an insulating layer.

FIG. 7B shows an electrical simulation of an optical or micro-hotplate device with a dielectric barrier according to various embodiments. The dielectric barrier may be formed by an insulating layer.

Figure 7C:
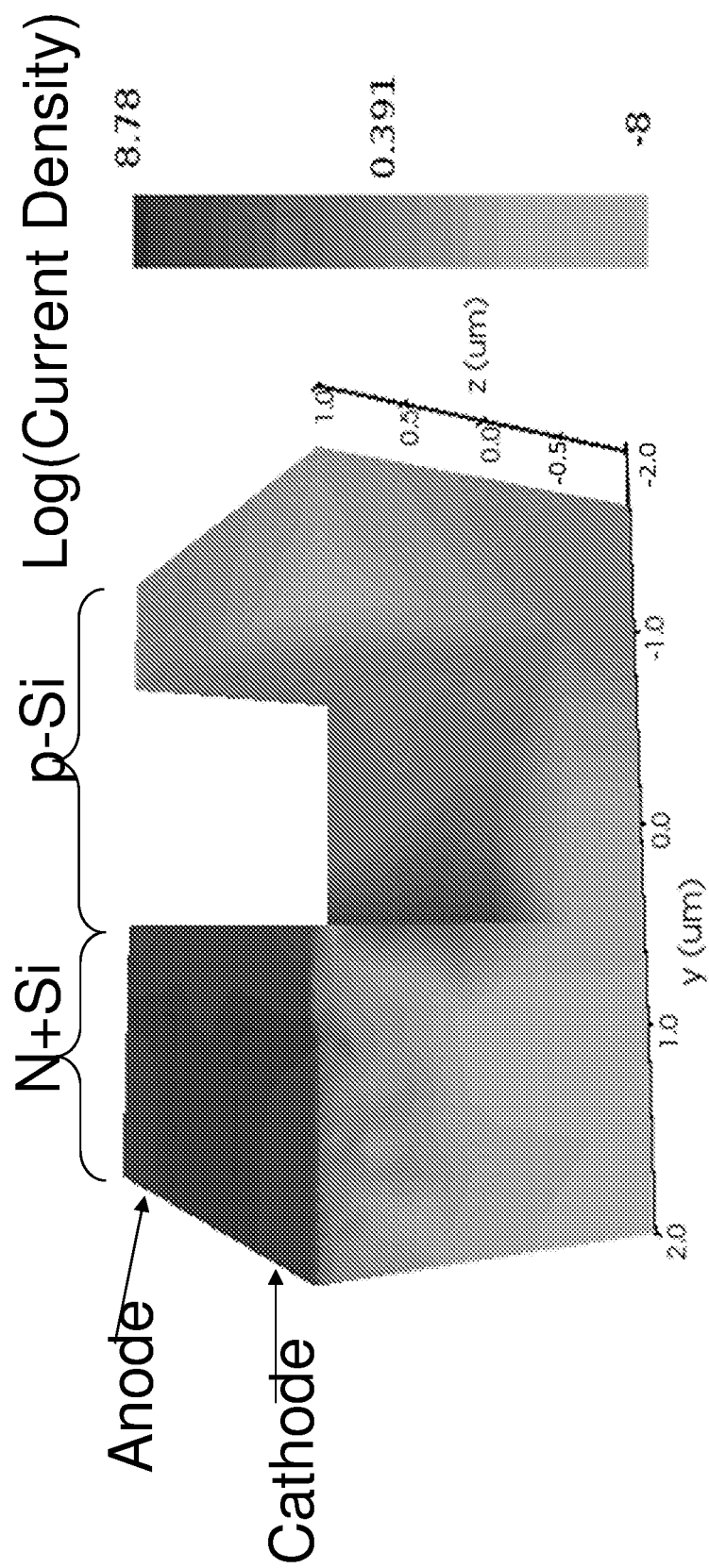
FIG. 7C shows an electrical simulation of an optical or micro-hotplate device with a dielectric barrier and a p-n junction according to various embodiments.

FIG. 7C shows an electrical simulation of an optical or micro-hotplate device with a dielectric barrier and a p-n junction according to various embodiments.

The dielectric barrier and/or the p-n junction may limit the current flow to within the emitter portion/active layer between the anode and cathode, and may thus reduce current spreading.

Various embodiments may relate to a device which have various functionalities to achieve focused, adjustable-directionality light emission.

Various embodiments may relate to an optical arrangement, such as a gas sensor, including the optical or micro-hotplate device as described herein. The gas sensor may be used to detect gases such as carbon dioxide ($CO_2$). In various embodiments, the gas sensor may include a grating coupler as well as a waveguide. In various embodiments, a single optical or micro-hotplate device may be used for detection as well as to act as a reference channel.

The grating coupler and waveguide may include a semiconductor such as germanium (Ge) with a refractive index of around 4.02 at wavelengths of about 4.3 μm to about 4.45 μm. The cladding below the waveguide may include aluminium nitride (AlN) with a refractive index of about 1.97 at wavelengths of about 4.3 μm to about 4.45 μm. The grating may have a filling factor of about 50% with a period of about 1.9 μm.

The relevant equation is $$\frac{\partial \lambda}{\partial \theta} = \frac{\Delta n \cos\theta}{m} \quad (2)$$

where λ is the coupling wavelength, Δ is the grating period, m is the diffraction order, n is the refractive index of the incident medium, and θ is the incident angle in radians (rad).

Figure 8A:
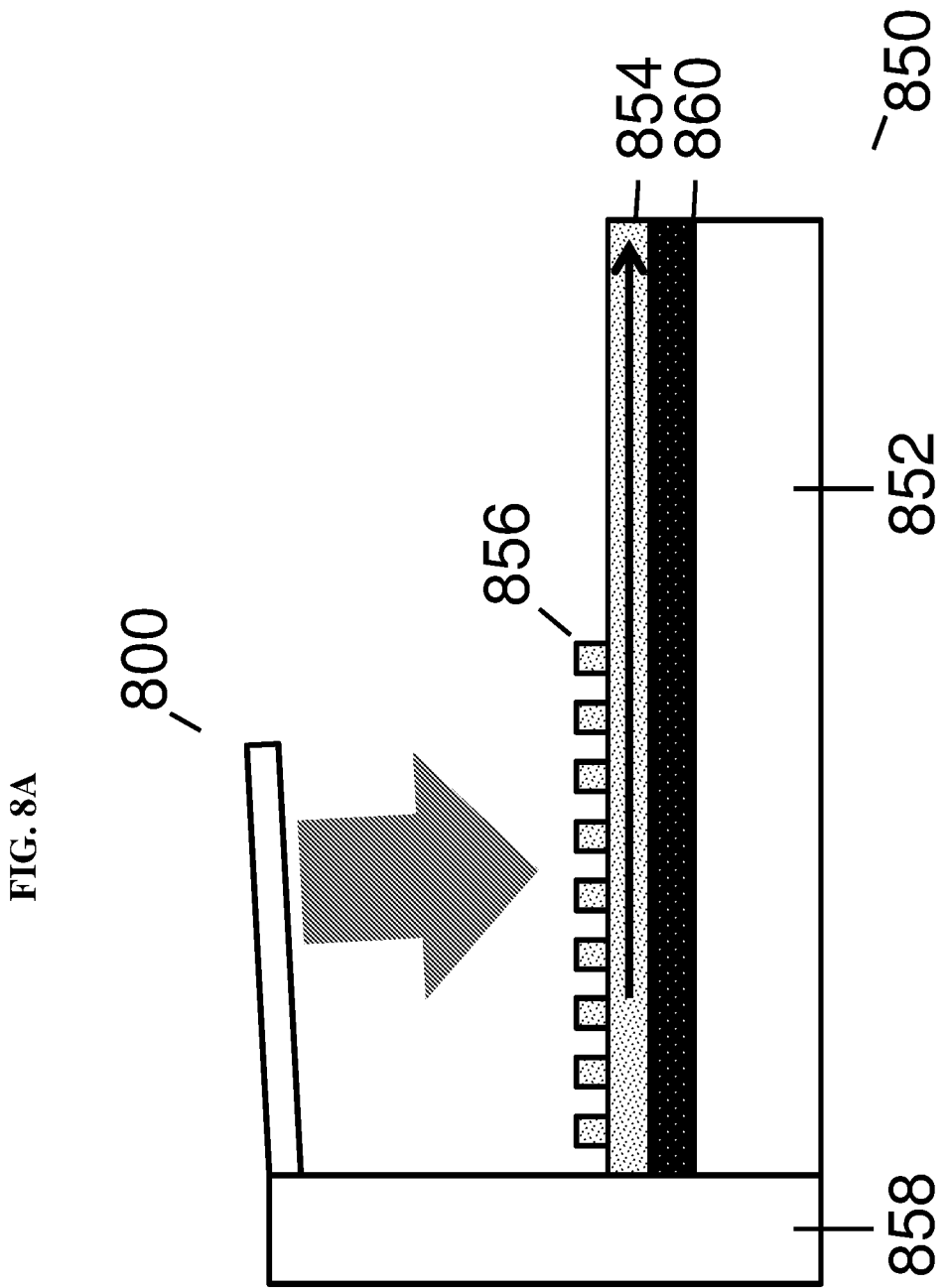
FIG. 8A is a schematic of a gas sensor according to various embodiments when the gas sensor is used to detect carbon dioxide ($CO_2$).
Figure 8B:
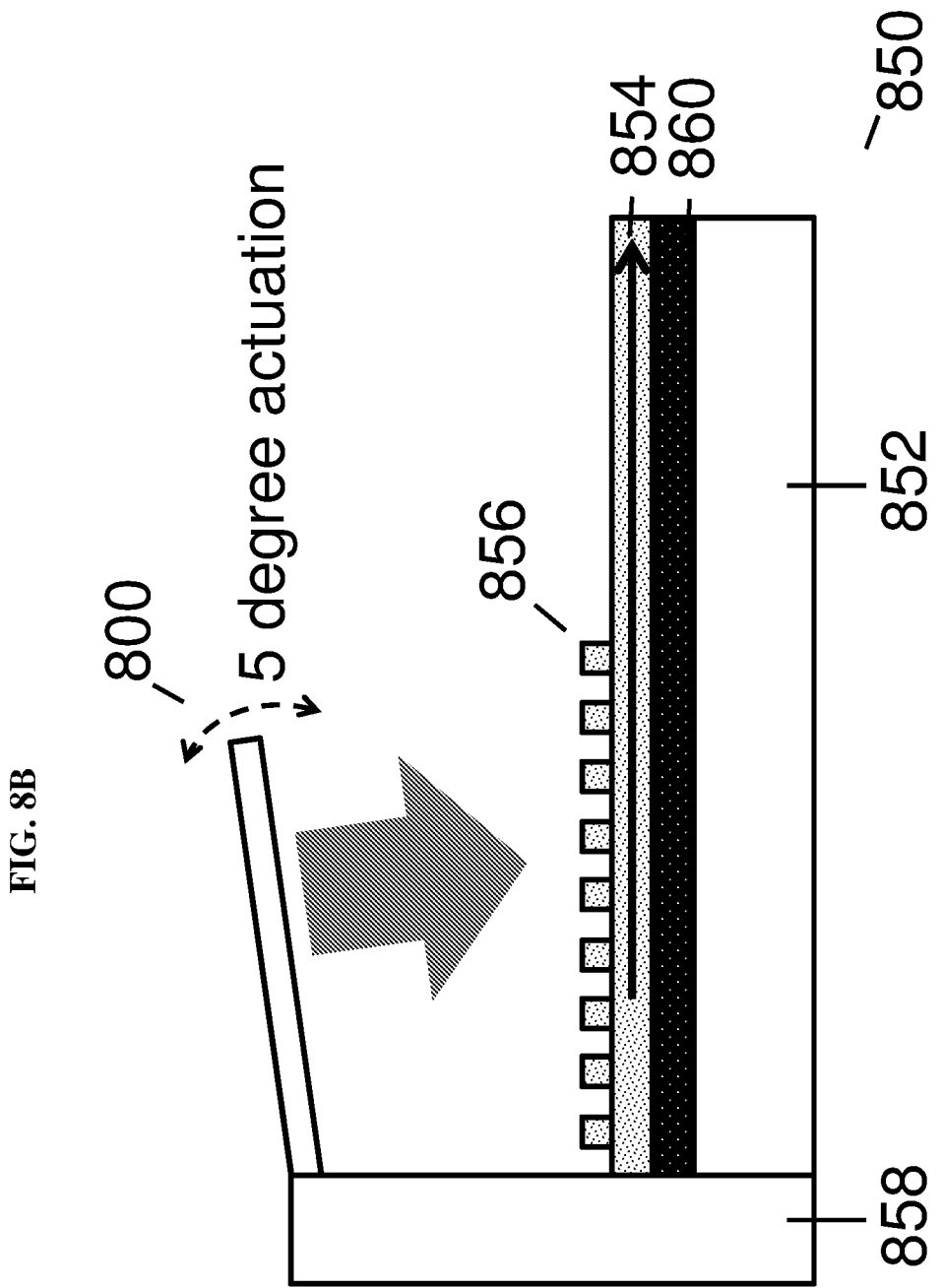
FIG. 8B is a schematic of the gas sensor shown in FIG. 8A according to various embodiments when the gas sensor is used for reference detection.

FIG. 8A is a schematic of a gas sensor 850 according to various embodiments when the gas sensor is used to detect carbon dioxide ($CO_2$). FIG. 8B is a schematic of the gas sensor 850 shown in FIG. 8A according to various embodiments when the gas sensor is used for reference detection. As shown in FIGS. 8A-B, the gas sensor 850 may include an optical or micro-hotplate device 800 as described herein. The gas sensor 850 may also include a detector portion including a substrate 852, a waveguide 854 over the substrate 852, and a grating coupler 856 on the waveguide 854. The gas sensor 850 may additionally include a support 858 configured to suspend the optical device 800 over the detector portion. The gas sensor 850 may also include a cladding layer 860 on the substrate 852. The waveguide 854 may be on the cladding layer 856. The gas sensor 850 may also include a detector (not shown in FIGS. 8A-B) optically coupled to the waveguide 854. The detector may be configured to detect the light travelling along the waveguide 854 to the detector.

The emitter portion or the active layer of the device 800 may face the detector portion. The gas sensor 950 may be configured such that a wavelength of the light that is received by the detector portion is based on the movement or deflection of the emitter portion or the active layer. The light emitted from the emitter portion or the active layer of the device 800 may pass through the gas to the detector portion. By controlling the movement or deflection of the emitter portion or the active layer, the wavelength of light coupled to the waveguide 854 and interacting with the gas may be controlled or varied. For instance, by changing the incident angle by 5 degrees, the coupling wavelength may be changed from 4.3 μm (as shown in FIG. 8A) to 4.45 μm (as shown in FIG. 8B). Since the absorption peak of carbon dioxide is not at 4.45 μm, the light at 4.45 μm passing through the waveguide 854 to the detector may be used as reference to the light at 4.3 μm for subtracting light loss due to scattering and other imperfections.

In contrast, a conventional method of gas sensing or detection involves using two separate detectors, one with filter at 4.3 μm to detect $CO_2$ absorption, and another with filter at a different wavelength such as at 4.0 μm. Various embodiments may only require a single detector. Various embodiments may allow more accurate measurements since differences associated with using two detectors is prevented or reduced.

Various embodiments may relate to a focused, adjustable broadband emitter that can be used for on-chip optical gas sensing applications and other commercial applications. Various embodiments may seek to fill a gap in applications that require a compact footprint and which can achieve adjustable, directional emission of a specific light spectrum. Various embodiments may allow for both actuation and emission to occur at the same time, which may result in higher efficiency from concentration of thermal and electrical power. Various embodiments may allow a single thermal emitter, a single waveguide, and a single detector to be able to detect both $CO_2$ and a reference signal for noise reduction. In contrast, two different detectors including a reference detector are required to achieve this purpose in a conventional method. Various embodiments may achieve this function with a single detector.

Various embodiments may include a feedback mechanism that allows for the adjustment of the normal direction of the emitter to the grating coupler by adjusting the angle until the light output that is received by the detector (on chip or off the chip) is maximized. The light coupled from the grating coupler may go through a photonics circuit before being absorbed by the detector and be read out as an electrical signal. This signal may be read into the on-chip circuit to allow for a feedback mechanism to adjust the angle by changing the actuation voltage until the maximum voltage is read.

Various embodiments may relate to a device with an emitter formed at one end, and having a silicon photonic crystal. The two electrodes at the sides of the silicon photonic crystals may be applied at high voltages to cause heating and thermal emission. The emission light spectrum may be modified by the photonic crystal to tune the spectrum, and to increase the vertical directionality. The actuation of the device may be provided by the piezoelectric layer attached at the other end of the device. The piezoelectric layer may be actuated by applying a voltage across the piezoelectric layer.

Various embodiments may provide focused emission from a micro-hotplate. Various embodiments may provide adjustable directionality of emission from the micro-hotplate. Various embodiments may relate to a device which can singly enable focused, broadband emission having a direction which can be adjusted.

Various embodiments may involve piezo-actuation, and may include oxide bars and p-junction barriers to enable the micro hotplate to emit light and be moved at the same time. Conventional micro-electromechanical systems (MEMS) mirrors are actuated with electrostatic comb devices which may not work for a micro hotplate device that is able to generate focused light, and which can be adjusted.

Various embodiments may provide enhancement of current density in the micro-hotplate, and may allow sufficient Joule heating for thermal emission in the mid infrared (IR) region.

Various embodiments may relate to a single, device on a chip of sub millimetre square in area is able to have a focused, adjustable broadband emission. Various embodiments may have less optical loss, may be less costly, and may occupy less space compared to a macroscopic assembly that have a light bulb, a lens, mirrors and alignment stages.

Various embodiments may have advantages such as focused beam, adjustable directionality, movable micro-hotplate or active layer, higher efficiency in operations of adjustments and emission (enabled by electrical design), smaller footprint (e.g. sub millimetre square), and reduced optical loss.

Various embodiments may be used for non-dispersive infrared (NDIR) detection, chemical/bio sensing, imaging applications, and/or telecommunications. Various embodiments may be used in chip-scale integration for optical sensors, imaging solutions requiring adjustable directionality such as Light Detection and Ranging (LIDAR), switching applications in telecommunications, and/or on-chip spectroscopy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical device including:
   an elongate substrate;
   an emitter portion at a distal end portion of the elongate substrate, the emitter portion configured to emit light; and
   an actuator portion at a proximal end portion of the elongate substrate opposite the distal end portion of the elongate substrate;
   wherein the emitter portion comprises a first electrode, a second electrode, and an active layer between the first electrode and the second electrode so that the light is emitted due to an increase in a temperature of the active layer upon application of a first potential difference between the first electrode and the second electrode;
   wherein the active layer is patterned to form a photonic crystal layer for enhancing a directionality of the emitted light; and
   wherein the actuator portion comprises a stacked arrangement comprising a first electrical pad, a second electrical pad, and a piezoelectric layer between the first electrical pad and the second electrical pad such that the actuator portion is configured to deform the elongate substrate upon application of a second potential difference between the first electrical pad and the second electrical pad, thereby moving the emitter portion.

2. The optical device according to claim 1,
   wherein the elongate substrate comprises dopants of a first charge polarity; and.
   wherein the active layer comprises dopants of a second charge polarity opposite the first charge polarity.

3. The optical device according to claim 2,
   wherein the elongate substrate is p-doped; and
   wherein the active layer is n-doped.

4. The optical device according to claim 3,
   wherein a portion of the active layer is in contact with the elongate substrate to form a p-n junction.

5. The optical device according to claim 1, further comprising:
   an insulator layer on the elongate substrate such that a first portion of the insulator layer is between the emitter portion and the elongate substrate, and a second portion of the insulator layer is between the actuator portion and the elongate substrate.

6. The optical device according to claim 5,
   wherein the insulator layer comprises silicon oxide.

7. The optical device according to claim 1,
wherein the piezoelectric layer comprises lead zirconate titanate, aluminium nitride or scandium aluminum nitride.

8. The optical device according to claim 1,
wherein the active layer comprises a plurality of holes extending from a first surface of the active layer to a second surface of the active layer opposite the first surface.

9. The optical device according to claim 8,
wherein the plurality of holes forms a periodic array.

10. The optical device according to claim 8,
wherein a diameter of a hole of the plurality of holes is of a value selected from a range from 0.5 μm to 2 μm.

11. The optical device according to claim 1,
wherein the light emitted by the emitter portion is within 1 steradian.

12. The optical device according to claim 1,
wherein the emitter portion remains undeformed during the deformation of the elongate substrate.

13. A gas sensor for sensing a gas, the gas sensor comprising:
a detector portion comprising:
a substrate;
a waveguide over the substrate; and
a grating coupler on the waveguide;
an optical device comprising:
an elongate substrate;
an emitter portion at a distal end portion of the elongate substrate, the emitter portion configured to emit light; and
an actuator portion at a proximal end portion of the elongate substrate opposite the distal end portion of the elongate substrate;
wherein the emitter portion comprises a first electrode, a second electrode, and an active layer between the first electrode and the second electrode so that the light is emitted due to an increase in a temperature of the active layer upon application of a first potential difference between the first electrode and the second electrode;
wherein the active layer is patterned to form a photonic crystal layer for enhancing a directionality of the emitted light; and
wherein the actuator portion comprises a stacked arrangement comprising a first electrical pad, a second electrical pad, and a piezoelectric layer between the first electrical pad and the second electrical pad such that the actuator portion is configured to deform the elongate substrate upon application of a second potential difference between the first electrical pad and the second electrical pad, thereby moving the emitter portion;
wherein the gas sensor further comprises:
a support configured to suspend the optical device over the detector portion;
wherein the emitter portion faces the detector portion; and
wherein the gas sensor is configured such that a wavelength of the light that is received by the detector portion is based on the movement of the emitter portion.

14. The gas sensor according to claim 13, further comprising:
a cladding layer on the substrate;
wherein the waveguide is on the cladding layer.

15. The gas sensor according to claim 13, further comprising:
a detector optically coupled to the waveguide;
wherein the detector is configured to detect the light travelling along the waveguide to the detector.

16. The gas sensor according to claim 15, further comprising:
a feedback circuit in electrical communication with the detector and the actuator portion;
wherein the detector is configured to generate a feedback electrical signal upon the detector detecting the light;
wherein the feedback circuit is further configured to generate an adjustment electrical signal based on the feedback electrical signal; and
wherein the actuator portion is configured to deform the elongate substrate based on the adjustment electrical signal.

17. A method of forming an optical device, the method comprising:
forming an emitter portion at a distal end portion of an elongate substrate, the emitter portion configured to emit light; and
forming an actuator portion at a proximal end portion of the elongate substrate opposite the distal end portion of the elongate substrate;
wherein the emitter portion comprises a first electrode, a second electrode, and an active layer between the first electrode and the second electrode so that the light is emitted due to an increase in a temperature of the active layer upon application of a first potential difference between the first electrode and the second electrode;
wherein the active layer is patterned to form a photonic crystal layer for enhancing a directionality of the emitted light; and
wherein the actuator portion comprises a stacked arrangement comprising a first electrical pad, a second electrical pad, and a piezoelectric layer between the first electrical pad and the second electrical pad such that the actuator portion is configured to deform the elongate substrate upon application of a second potential difference between the first electrical pad and the second electrical pad, thereby moving the emitter portion.

18. A method of forming a gas sensor, the method comprising:
forming a detector portion comprising:
a substrate;
a waveguide over the substrate; and
a grating coupler on the waveguide;
forming an optical device comprising:
an elongate substrate;
an emitter portion at a distal end portion of the elongate substrate, the emitter portion configured to emit light; and
an actuator portion at a proximal end portion of the elongate substrate opposite the distal end portion of the elongate substrate;
wherein the emitter portion comprises a first electrode, a second electrode, and an active layer between the first electrode and the second electrode so that the light is emitted due to an increase in a temperature of the active layer upon application of a first potential difference between the first electrode and the second electrode;
wherein the active layer is patterned to form a photonic crystal layer for enhancing a directionality of the emitted light; and wherein the actuator portion comprises a stacked arrangement comprising a first electrical pad, a second electrical pad, and a piezoelectric layer between the first electrical pad and the second electrical pad such that the actuator portion is configured to deform the elongate substrate upon application of a second potential difference between the first electrical pad and the second electrical pad, thereby moving the emitter portion;

wherein the method further comprises:

forming a support configured to suspend the optical device over the detector portion;

wherein the emitter portion faces the detector portion; and wherein the gas sensor is configured such that a wavelength of the light that is received by the detector portion is based on the movement of the emitter portion.

19. A method of operating an optical device, the method comprising:

activating an emitter portion at a distal end portion of an elongate substrate to emit light by applying a first potential difference between a first electrode and a second electrode so that a temperature of an active layer between the first electrode and the second electrode increases to emit the light, the active layer being patterned to form a photonic crystal layer for enhancing a directionality of the emitted light; and activating an actuator portion at a proximal end portion of the elongate substrate opposite the distal end portion of the elongate substrate to deform the elongate substrate by applying a second potential difference between a first electrical pad and a second electrical pad of a stack arrangement, the stacked arrangement further comprising a piezoelectric layer between the first electrical pad and the second electrical pad, to move the emitter portion.

20. A method of operating a gas sensor to sense a gas, the method comprising:

operating an optical device suspended over a detector portion by a support with an emitter portion of the optical device facing the detector portion, so that a wavelength of light that is received by the detector portion is based on the movement of the emitter portion;

wherein the optical device comprises:

an elongate substrate;

the emitter portion at a distal end portion of the elongate substrate, the emitter portion configured to emit the light; and an actuator portion at a proximal end portion of the elongate substrate opposite the distal end portion of the elongate substrate;

wherein the emitter portion comprises a first electrode, a second electrode, and an active layer between the first electrode and the second electrode so that the light is emitted due to an increase in a temperature of the active layer upon application of a first potential difference between the first electrode and the second electrode;

wherein the active layer is patterned to form a photonic crystal layer for enhancing a directionality of the emitted light; and wherein the actuator portion comprises a stacked arrangement comprising a first electrical pad, a second electrical pad, and a piezoelectric layer between the first electrical pad and the second electrical pad such that the actuator portion is configured to deform the elongate substrate upon application of a second potential difference between the first electrical pad and the second electrical pad, thereby moving the emitter portion; and wherein the detector portion comprises:

a substrate;

a waveguide over the substrate; and a grating coupler on the waveguide.

* * * * *